United States Patent [19]

Wise et al.

[11] 4,205,673

[45] Jun. 3, 1980

[54] BREATHING APPARATUS WITH AN AUTOMATIC FIRING MECHANISM

[75] Inventors: Layton A. Wise, Washington; Robert F. Menold, Monroeville, both of Pa.

[73] Assignee: Mine Safety Appliances Company, Pittsburgh, Pa.

[21] Appl. No.: 9,104

[22] Filed: Feb. 5, 1979

[51] Int. Cl.$^2$ .................... A62B 7/08; B01J 7/00

[52] U.S. Cl. .................... 128/202.26; 422/120; 422/122; 422/165

[58] Field of Search .............. 422/126, 120, 122, 165, 422/166; 128/142 R, 142 G, 142.2, 142.3

[56] References Cited

U.S. PATENT DOCUMENTS

| | | | |
|---|---|---|---|
| 1,323,540 | 12/1919 | Moore | 435/165 |
| 1,339,489 | 5/1920 | Weiss | 435/165 |
| 1,888,935 | 11/1932 | Placek | 435/165 |
| 2,086,701 | 7/1937 | Dreyfus | 127/37 |
| 2,739,086 | 3/1956 | Wallace | 260/347.9 |
| 2,758,015 | 8/1956 | Bovard et al. | 422/120 X |
| 2,768,176 | 10/1956 | Diotti | 260/347.9 |
| 2,862,008 | 11/1958 | Skogh | 260/347.9 |
| 2,884,428 | 4/1959 | Wamsley | 260/347.9 |
| 3,115,504 | 12/1963 | Asplund | 260/347.9 |
| 3,523,911 | 8/1970 | Funk | 127/37 X |
| 3,580,250 | 5/1971 | Oroza | 422/120 X |
| 3,620,683 | 11/1971 | Hwoschinsky et al. | 128/142.3 X |
| 3,655,346 | 4/1972 | Cotabish et al. | 422/122 |
| 3,817,786 | 6/1974 | Algeo | 127/37 X |
| 4,023,982 | 5/1977 | Knauth | 127/37 X |
| 4,072,538 | 2/1978 | Fahn | 127/37 |

*Primary Examiner*—Barry S. Richman
*Attorney, Agent, or Firm*—Brown, Flick & Peckham

[57] ABSTRACT

A candle for producing oxygen when ignited is mounted in the bottom of a chemical canister that is to be inserted in an open-bottom breathing apparatus receptacle provided with a depending projection. A primer for igniting the candle extends through the bottom of the canister and is exposed in the top of a firing mechanism housing secured to the canister bottom. At one side of the primer a hammer has one end pivotally connected to the housing on a transverse axis, with a spring urging the free end of the hammer into contact with the primer. Pivotally mounted in the housing on a transverse axis below the hammer is a trigger having one end engaging the bottom of the free end of the hammer in its cocked position, with the opposite end of the trigger positioned to be engaged by the receptacle projection when the canister is moved up into the receptacle, whereby to turn the trigger to disengage it from the hammer in order to release the hammer.

7 Claims, 4 Drawing Figures

Fig. 2
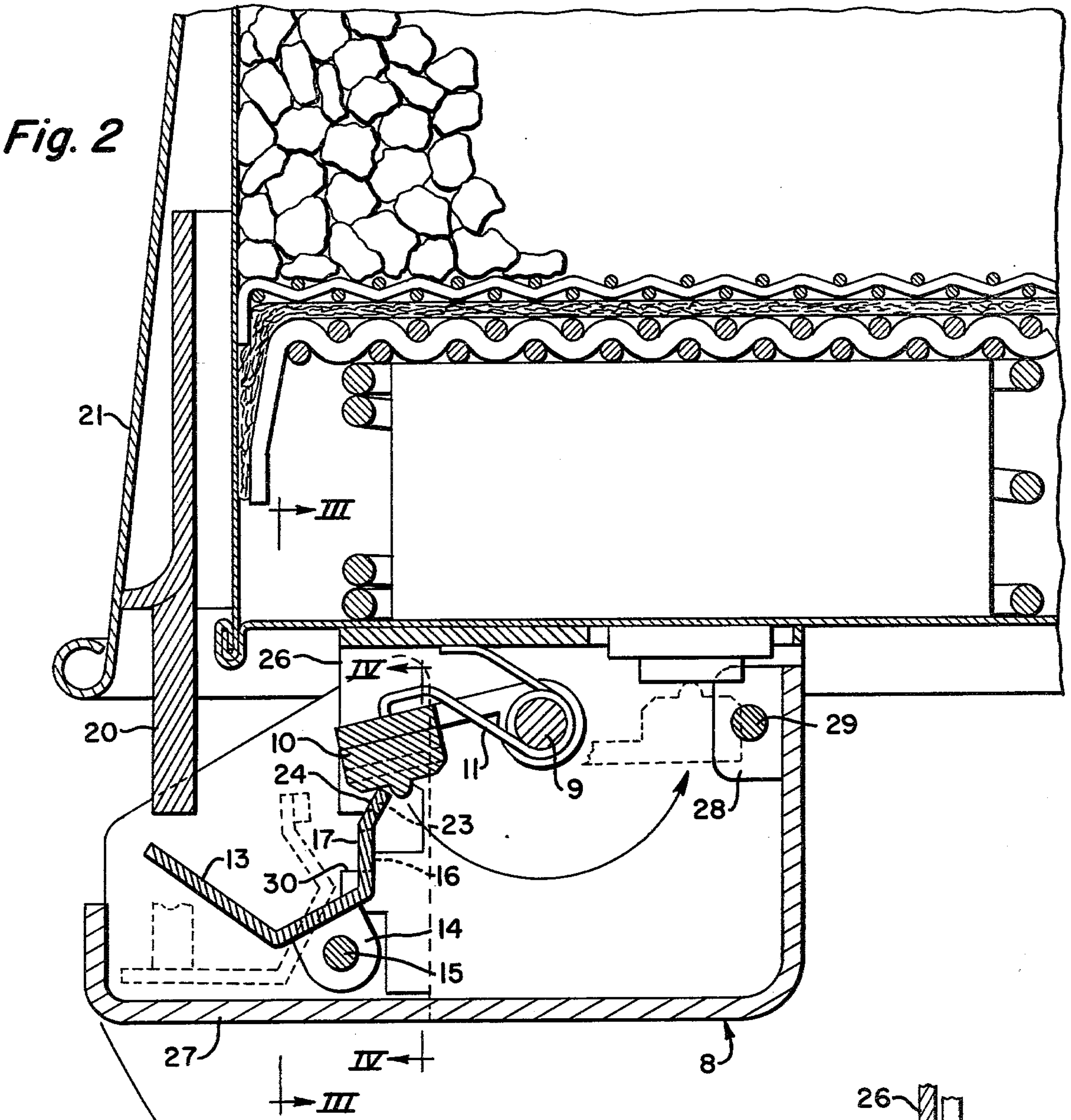
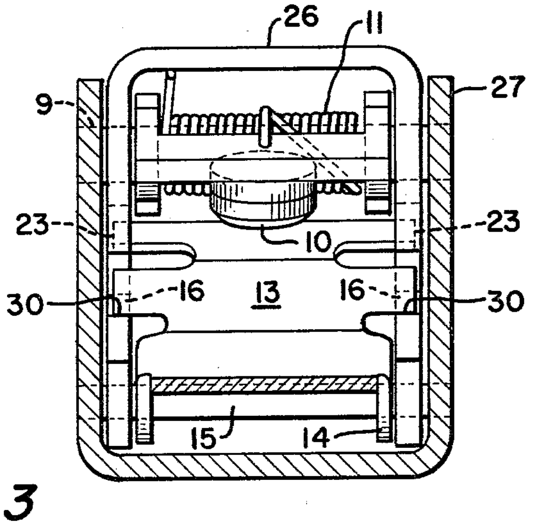
Fig. 3
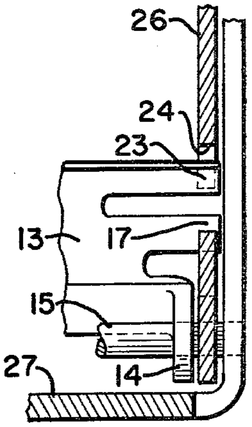
Fig. 4

BREATHING APPARATUS WITH AN AUTOMATIC FIRING MECHANISM

Chemical canisters for use in breathing apparatus often are provided with oxygen producing candles for quickly producing oxygen until the chemical in the canister starts generating enough oxygen to sustain life. Such candles have been ignited by manually operated firing mechanisms, but there always is the possibility that the user may neglect to operate the firing mechanism. Also, the canisters generally are inserted up into breathing apparatus receptacles to connect the canisters into the breathing circuits.

It is among the objects of this invention to provide breathing apparatus in which the firing mechanism for an oxygen candle in a chemical canister is automatically operated when the canister is inserted in its receptacle, and in which the firing mechanism cannot interfere with complete insertion of the canister.

The preferred embodiment of the invention is illustrated in the accompanying drawings, in which FIG. 1 is a front view of a breathing apparatus receptacle partly broken away to show a chemical canister inside of it;

FIG. 2 is an enlarged fragmentary vertical section through the receptacle, canister and firing mechanism;

FIG. 3 is a vertical section of the firing mechanism taken on the III—III of FIG. 2; and FIG. 4 is a fragmentary vertical section taken on the line IV—IV of FIG. 2.

Figure 1:
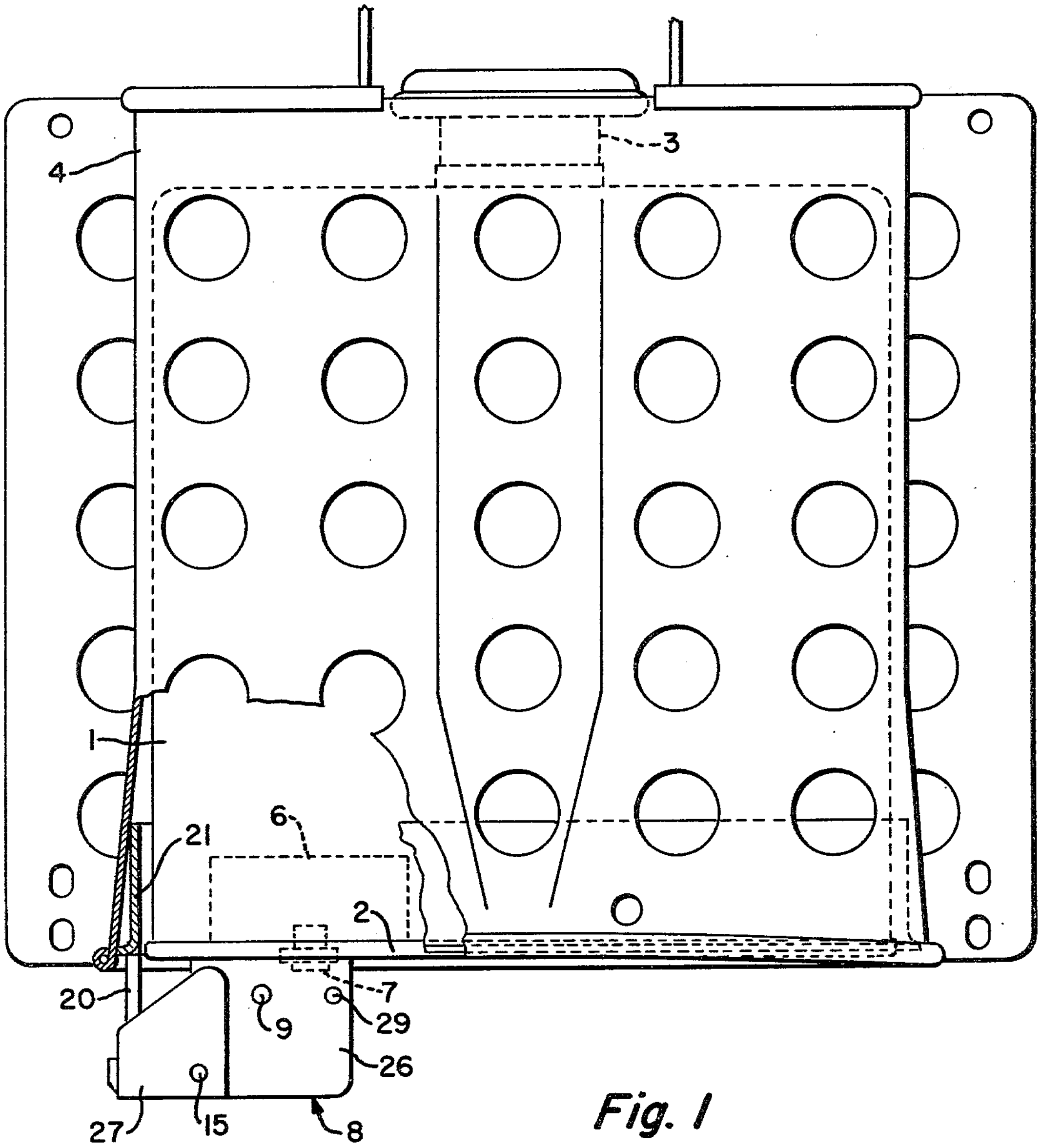

Referring to FIG. 1 of the drawings, a conventional breathing apparatus canister 1 containing a chemical, such as $KO_2$, that absorbs carbon dioxide and generates oxygen when moist air is exhaled through it, has a bottom wall 2 and an upwardly extending neck 3. The upper end of the neck is sealed with a metal disk that is punctured in a well-known manner when the canister is put into use by inserting it up into open-bottom receptacle 4 in conventional breathing apparatus.

In order to produce a sufficient amount of oxygen as soon as the canister is placed in a breathing circuit, but before the chemical has started to function, a candle 6 is mounted in the bottom of the canister below the chemical. This is a chlorate candle that will produce oxygen immediately when ignited. Ignition is by means of a primer 7 extending from the candle down through an opening in the bottom of the canister and into the top of the housing 8 of a firing mechanism for the primer. This firing mechanism is secured to the bottom of the canister and projects laterally a short distance from one edge. Mounted in the upper part of housing 8 transversely thereof between the primer and the adjacent edge of the canister there is a pivot pin 9 on which one end of a firing pin hammer 10 is rotatably mounted as shown in FIG. 2. A torsion spring 11 engaging the hammer urges its free end up against the primer, but this free end can be swung down away from the primer against the resistance of the spring and upwardly into the cocked position shown in FIG. 2 between the pivot pin and the adjacent edge of the canister.

To hold the hammer in cocked position, a trigger is provided. This trigger 13 has a central portion with downwardly bent ears 14 at its opposite edges pivotally mounted on a pin 15 that extends parallel to pin 9 beneath the free end of the cocked hammer. The inner end of this trigger extends upwardly into engagement with the bottom of the hammer to hold it in cocked position. This end of the trigger is prevented from swinging inwardly from its operative position by means of shoulders 16 in the housing that are engaged by lateral projections 17 on the trigger. The opposite end of the trigger extends toward the outer end of the housing far enough to project beyond the overlying side of the canister.

The canister is intended to be pushed up into receptacle 4 far enough for the seal in the neck of the canister to be punctured and for the canister to make a sealed connection with the breathing circuit. It is a feature of this invention that during insertion of the canister in the receptacle the firing pin hammer 10 will be released automatically so that the candle in the canister will be ignited without any thought being given to it by the user. Accordingly, the canister receptacle is provided with a downwardly extending rigid member or prong 20 that will be directly above the outer end of the trigger when the canister is inserted in the receptacle, as shown in FIG. 2. This prong extends downwardly from a ring 21 that is rigidly mounted in the lower part of the receptacle. The prong extends downwardly far enough to be engaged by the outer end of the trigger shortly before the canister reaches its final upper position in the receptacle. As the canister is moved up, the outer end of the trigger engages the lower end of the prong and is stopped while the rest of the firing mechanism continues its upward movement. This action swings the inner end of the trigger outwardly away from the hammer, which spring 11 then swings around with considerable force into engagement with the primer to fire it. Thus, ignition of the candle occurs automatically when the canister is inserted in the receptacle.

It is desirable to prevent inadvertent release of the hammer, which can be done by providing opposite edges of the inner end of the trigger with laterally projecting tabs 23, the outwardly facing surfaces of which engage, or are close to, shoulders 24 in the housing as shown in FIGS. 2, 3 and 4. In order to rotate the trigger from its hammer-cocking position it then is necessary for it to exert enough force upwardly against prong 20 to bend the tabs so that they can move past shoulders 24 as indicated in dotted lines in FI G. 2.

Another feature of this invention is that the firing mechanism housing can be made in two parts pivotally connected together so that, due to possible differences in the distance prong 20 projects from the bottom of the receptacle, there will be no danger of the prong pressing the outer end of the trigger against the bottom of housing 8 before the canister has been raised to its operative position and thus stopping upward movement of the canister. Accordingly, one part of the housing is a frame 26 having only an upper wall and two parallel downwardly extending side walls, the upper wall being attached to the bottom of the canister. The pivot pin 9 for the hammer is mounted in the side walls. On the other hand, the pivot pin 15 for the trigger is mounted in the lower part of the upwardly extending side walls of a bottom cover 27 for the frame.

The bottom of the cover closes the bottom of frame 26. The cover also has an inner end wall, the upper end of which is provided with parallel ears 28 pivotally mounted on a pin 29 mounted in the side walls of the frame. The inner portions of the side walls of the cover overlap the outer surfaces of the outer portions of the side walls of the frame, and it is the overlapped portions of the frame side walls that are provided with the shoulders 16 and 24 that are engaged by the projections 17 and tabs 23 on the trigger. The trigger projections 17 also overlie and rest on horizontal shoulders 30 on the frame to normally support the outer end portion of the cover. When the trigger is swung by the receptacle projection 20 away from the hammer, the trigger projections 17 are simultaneously swung away from shoulders 30, whereupon the trigger no longer supports cover 27 and the latter will swing downwardly away from the frame. This action will prevent any possibility of prong 20 interfering with movement of the canister up in the receptacle to its final operative position.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with an open-bottom breathing apparatus receptacle provided with a downwardly depending projection near one side thereof and in the immediate proximity of said open bottom, of a chemical canister insertable upwardly into the receptacle, a candle inside the lower part of the canister for producing oxygen when ignited, a firing mechanism housing secured to the bottom of the canister, a primer for igniting the candle projecting down through the bottom of the canister, an opening in the top of the housing exposing the primer, a hammer in the housing having one end connected to the housing on a transverse axis at one side of the primer, a spring urging the free end of the hammer into contact with the primer, said free end being movable away from the primer to a cocked position, a trigger pivotally mounted in the housing on a transverse axis below the hammer and having one end engaging the bottom of the free end of the hammer in its cocked position to hold it cocked, the opposite end of the trigger being positioned to be engaged by said receptacle projection when the canister is moved up into the receptacle, whereby to depress said opposite end of the trigger to disengage it from the hammer so as to release the hammer and thereby ignite the primer.

2. The combination recited in claim 1, including means limiting movement of said opposite end of the trigger toward the pivoted end of the hammer.

3. The combination recited in claim 1, including releasable means normally holding said trigger in hammer-cocking position, said means being releasable when said opposite end of the trigger is pressed against said receptacle projection with a predetermined force.

4. The combination recited in claim 3, in which said releasable means includes a bendable tab projecting laterally from said one end of the trigger, and means in said housing substantially engaging the side of said tab facing away from the primer.

5. The combination recited in claim 1, in which said housing includes a frame supporting said hammer, a bottom cover for the frame supporting the trigger, means pivotally connecting the end of the cover remote from the trigger with said frame, the trigger and frame having means supporting said cover until the trigger is turned by said receptacle projection.

6. The combination recited in claim 5, in which said last-mentioned means include a lateral projection on the trigger and a shoulder on said frame supporting said projection.

7. The combination recited in claim 5, including a bendable tab projecting laterally from said one end of the trigger, and a shoulder on said frame engaging the side of said tab facing away from the primer.

* * * * *